United States Patent [19]

Lawrence et al.

[11] Patent Number: 6,038,337
[45] Date of Patent: *Mar. 14, 2000

[54] METHOD AND APPARATUS FOR OBJECT RECOGNITION

[75] Inventors: Stephen Robert Lawrence, Indooroopilly, Australia; C. Lee Giles, Lawrenceville, N.J.

[73] Assignee: NEC Research Institute, Inc., Princeton, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/625,028

[22] Filed: Mar. 29, 1996

[51] Int. Cl.[7] .............................. G06K 9/62; G06K 9/46
[52] U.S. Cl. ..................... 382/156; 382/155; 382/159; 382/190
[58] Field of Search ..................... 382/156, 118, 382/115, 155, 157, 159, 190, 195, 181, 224, 226, 205, 299, 298, 203; 395/21–27

[56] References Cited

U.S. PATENT DOCUMENTS

| | | | |
|---|---|---|---|
| 5,408,585 | 4/1995 | Burel | 395/21 |
| 5,450,504 | 9/1995 | Calia | 382/118 |
| 5,497,430 | 3/1996 | Sadovnik et al. | 382/156 |

FOREIGN PATENT DOCUMENTS

| | | | |
|---|---|---|---|
| 5-20422 | 1/1993 | Japan | G06F 15/62 |
| 5-143651 | 6/1993 | Japan | G06F 15/40 |
| 7-141506 | 6/1995 | Japan | G06T 7/10 |

OTHER PUBLICATIONS

R. Chellappa, C.L. Wilson and S. Sirohey, "Human and Machine Recognition of Faces: A Survey", May 1995, in Proceedings of the IEEE, vol. 83, pp. 705–740.

R. Brunelli and T. Poggio, "Face Recognition: Features Versus Templates", 1993, in Pattern Analysis and Machine Intelligence, 15(10), pp. 1042–1052.

I. Cox, J. Ghosn and P. Yianilos, "Feature–Based Face Recognition Using Mixture–Distance", Oct. 1995, in a Technical Report from NEC Research Institute, Princeton, NJ.

M. Turk and A. Pentland, "Eigenfaces for Recognition", 1991 in Journal of Cognitive Neuroscience, vol. 3, pp. 71–86.

D. DeMers and G. Cottrell, "Non–linear Dimensionality Reduction", in Advances in Neural Information Processing Systems 5, pp. 580–587.

J. Weng, N. Ahuja, and T.S. Huang, "Learning Recognition and Segmentation of 3–D Objects from 2–D Images", 1993, in International Conference on Computer Vision 93, pp. 121–128.

T. Kohonen, "The Self–Organizing Map", 1990, in Proceedings of the IEEE, vol. 78, pp. 1464–1480.

Y. LeCun, et al., "Handwritten Digit Recognition with Back–Propagation Network", 1990, in Advances in Neural Information Processing Systems 2, pp. 396–404.

*Primary Examiner*—Jose L. Couso
*Assistant Examiner*—Duy M. Dang
*Attorney, Agent, or Firm*—Jeffrey J. Brosemer; Andrew G. Isztwan

[57] ABSTRACT

A hybrid neural network system for object recognition exhibiting local image sampling, a self-organizing map neural network, and a hybrid convolutional neural network. The self-organizing map provides a quantization of the image samples into a topological space where inputs that are nearby in the original space are also nearby in the output space, thereby providing dimensionality reduction and invariance to minor changes in the image sample, and the hybrid convolutional neural network provides for partial invariance to translation, rotation, scale, and deformation. The hybrid convolutional network extracts successively larger features in a hierarchical set of layers. Alternative embodiments using the Karhunen-Loève transform in place of the self-organizing map, and a multi-layer perceptron in place of the convolutional network are described.

10 Claims, 4 Drawing Sheets

METHOD AND APPARATUS FOR OBJECT RECOGNITION

TECHNICAL FIELD

This invention relates generally to the field of object recognition and in particular to a neural network method and apparatus for object and/or face recognition.

DESCRIPTION OF THE PRIOR ART AND PROBLEM

The need for reliable personal identification methods, particularly for computerized access control has resulted in an increased interest in biometrics, that is, physiological or behavioral characteristics which uniquely identify individuals. Biometric characteristics presently attracting a considerable amount of interest include fingerprints, speech, signature dynamics and face recognition. Of these biometric characteristics, face recognition has the distinct benefit of being a passive, non-intrusive system for verifying a personal identity. (See e.g., R. Chellappa, C. L. Wilson, and S. Sirohey, "Human and Machine Recognition of Faces: A Survey", Proceedings of the IEEE, Vol. 83, pp. 705–740, May 1995).

By way of background, the techniques used in face recognition systems depend largely upon the particular application of the face recognition system. For example, if one desires to find the face of a person within a large database of faces, e.g., in a police database, it is generally not necessary that the face recognition be performed in real-time. As such, these non-real-time systems are only typically required to return a list of the most likely faces in the database. These faces can then be analyzed by a human operator.

In sharp contrast, real-time face recognition applications impose demanding requirements on face recognition systems. Specifically, in those applications where it is necessary to identify a particular person or persons in real-time, e.g., in a security monitoring system, location tracking system, or a security access system, a face must be quickly and accurately recognized, else serious security breaches/consequences may result.

Much prior-art effort has been expended exploring geometrical, feature-based methods of face recognition. In particular, R. Brunelli and T. Poggio in an article entitled "Face Recognition: Features Versus Templates", which appeared in Pattern Analysis and Machine Intelligence, 15(10), pp. 1042–1052; describe a method which computes a set of geometrical features of faces such as nose width and length, mouth position, and chin shape. Others, such as I. Cox, J. Ghosn, and P. Yianilos describe a mixture-distance technique in a technical report entitled "Feature-Based Face Recognition Using Mixture-Distance", NEC Research Institute, Princeton, N.J., October 1995, which achieves a relatively high recognition rate by representing each face with 30 manually extracted distances.

Systems which utilize methods employing precisely measured distances between features are highly dependent upon the particular feature point location method. Unfortunately, current methods for the automatic location of feature points do not provide a high degree of accuracy, are not very robust and therefore do not readily lend themselves to demanding, realtime application of face recognition.

Recently, M. Turk and A. Pentland, in an article entitled "Eigenfaces for Recognition", which appeared in the Journal of Cognitive Neuroscience, Vol. 3, pp. 71–86, 1991, and in U.S. Pat. No. 5,164,992 entitled "Face Recognition System" which issued on Nov. 17, 1992, describe a face recognition scheme in which facial images are projected onto the principal components of an original set of training images. The resulting "eigenfaces" are classified by comparison with known individuals. This linear principle components technique assumes that the faces lie in a lower dimensional space, and hence the sum or average of two faces should also be a face. This assumption fails when applied to an entire face.

Most recently, the prior art has focused on face-recognition techniques which utilize neural networks. Specifically, D. DeMers and G. Cottrell, in an article entitled "Non-linear Dimensionality Reduction", which appeared in Advances in Neural Information Processing Systems 5, pp. 580–587, S. J. Hanson, J. D. Cowan, and C. L. Giles, eds., Morgan Kaufman, San Mateo, 1993, describe a system in which the first 50 principal components of a set of images are extracted and reduced to 5 dimensions using an autoassociative neural network. The resulting representation is then classified using a standard multi-layer perceptron. Unfortunately, the database used by these authors is quite simple, the pictures are manually aligned and there is no lighting variation, rotation, or tilting of the images. As such, the systems and methods disclosed therein are generally not suitable for demanding, realtime recognition applications.

A hierarchical neural network which was automatically grown and not trained with a gradient-descent training algorithm was used for face recognition by J. Weng, N. Ahuja, and T. S. Huang and described in the article "Learning Recognition and Segmentation of 3-D Objects from 2-D Images", which appeared in International Conference on Computer Vision 93, pp. 121–128, 1993. The system disclosed in this article operates on directional edges extracted from the image, thereby ignoring most of the information in the image and introducing dependence on the performance of the edge extraction algorithm. The learning algorithm is incremental and hence cannot learn to extract optimal features for given objects. As such, the system has only been shown to work in very simple discrimination tasks.

Finally, in U.S. Pat. No. 5,386,103 issued to DeBan, et al. in January 1995, the inventors describe a face recognition method and system which projects original images onto eigenvectors of the covariance matrix of a training set. A neural network is subsequently used to compare coefficients with stored values.

Despite initial optimism and promise, however, existing prior art methods and techniques for face recognition suffer from several serious limitations. In particular, "eigenface" methods such as those described by Turk and Pentland, template matching techniques such as the one described by Brunelli and Paggio, and the method and apparatus disclosed by DeBan, et al., are limited due to the requirement of a high degree of correlation between the pixel intensities of the training and test images. Additionally, they are only effective when the query images have the same scale, orientation, and illumination as the training images. Finally, they are not invariant to local deformation in the image, such as a different facial expression.

Consequently, a continued need remains in the art for a method and apparatus which quickly, reliably and accurately recognizes faces.

SUMMARY OF THE INVENTION AND SOLUTION

The above problems are solved and an advance is made over the prior art in accordance with the principles of the present invention which combines a local image sampling technique, a self-organizing map neural network, and a convolutional neural network into a face recognition system.

Specifically, a fixed size window is stepped over one or more entire images in a set of images and local image samples are extracted at each step.

A self-organizing map is trained on a set of vectors generated in the previous step. The self organizing map quantizes the input vectors into a number of topologically ordered values. Alternatively, a Karhunen-Loève transform may be substituted for the self organizing map whereby the Karhunen-Loève transform projects the vectors from one space to another space of lower dimension.

Subsequently, the fixed sized window is then stepped over all of the images contained in any training and test sets. The resulting local image samples are passed through the self organizing map at each step, thereby creating new training and test sets in the output space created by the self-organizing map. Each face image input to the system is finally represented by a number of maps, each of which corresponds to a dimension in the self organizing map. Finally, a convolutional neural network is trained on the newly created training set.

Further features and advantages of the present invention, as well as the structure and operation of various embodiments of the present invention are described in detail below with reference to the accompanying drawings.

BRIEF DESCRIPTION OF THE DRAWINGS

The teachings of the present invention can be readily understood by considering the following detailed description in conjunction with the accompanying drawings, in which.

DETAILED DESCRIPTION

A preferred embodiment of the invention will now be described while referring to the figures, several of which may be simultaneously referred to during the course of the following description.

Figure 1:
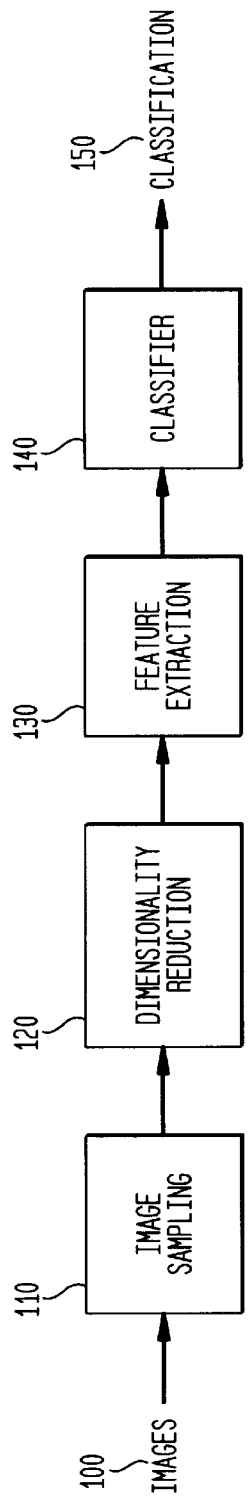
FIG. 1 is a high-level block diagram of a face recognition system utilizing the teachings of the present invention.

Referring now to FIG. 1, there is shown a flowchart which depicts the high-level processing of images and their subsequent classification. Specifically, images 100 are sampled at image sampling block 110, processed by dimensionality reduction block 120, feature extraction block 130, and classifier block 140 which produces a classification 150 of the processed image(s).

Figure 2:
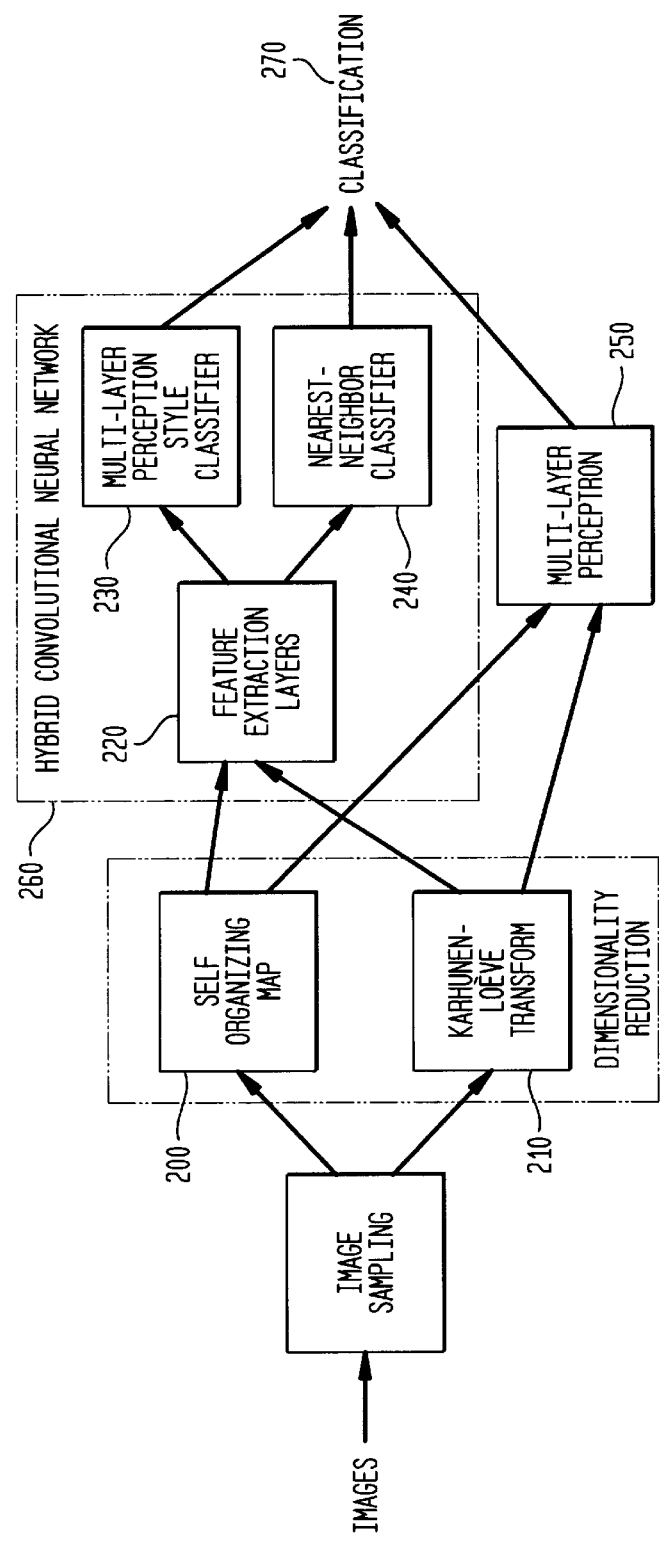
FIG. 2 is a detailed block diagram of the system of FIG. 1 showing alternatives for various functions.

With reference now to FIG. 2, there is shown a system for performing the processing depicted in FIG. 1. In particular, images are sampled and results of the sampling are presented to either a self-organizing map 200, or alternatively, a Karhunen-Loève Transform module 210 for dimensionality reduction. Classification of the sampled and reduced images is performed by multi-layer perceptron 250, or alternatively hybrid convolutional neural network 260 which includes feature extraction layers 220, and multi-layer perceptron style classifier 230, or nearest neighbor classifier 240. The resulting output of the hybrid convolutional neural network or the multi-layer perceptron is image classification 270.

Figure 3:
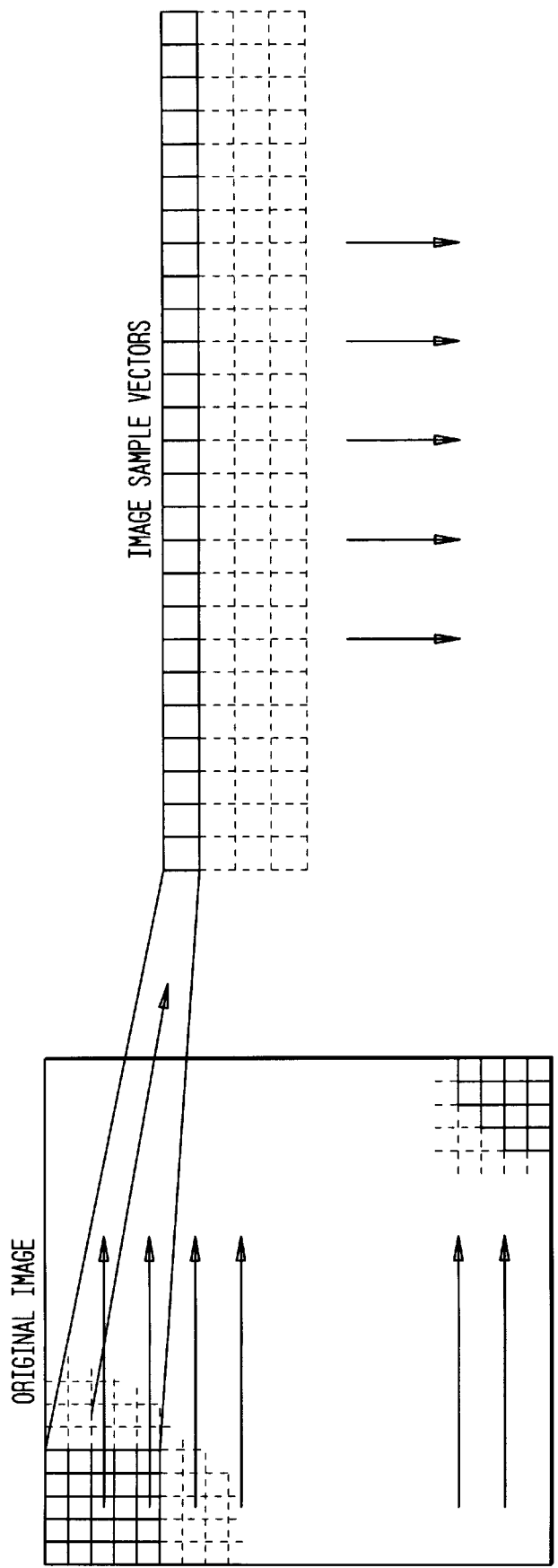
FIG. 3 is a depiction of a local image sampling process.

Two different methods of representing a local image sample have been used and evaluated in the construction of the present invention. In each of the two methods, as shown in FIG. 3, a window is scanned (stepped) over the image and a vector is created for each location of the image stepped over.

The first of the two image representation methods generates a vector from a local window positioned on the image using intensity values corresponding to each point in the window. Specifically, if $x_{ij}$ is defined to be the intensity at the $i^{th}$ column and the $j^{th}$ row of the given image, and the local window is a square having sides 2W+1 long, centered on $x_{ij}$, then the vector associated with this window is simply $[x_{i-W,j-W}, x_{i-W,j-W+1}, \ldots, x_{ij}, \ldots, x_{i+W,j+W-1}, x_{i+W,j+W}]$.

The second of the two image representation methods generates a representation of the local sample by forming a vector from a) the intensity of a center pixel $x_{ij}$, and b) an intensity difference between the center pixel and all other pixels contained within a square window. The vector so formed is given by $[x_{ij}-x_{i-W,j-W}, x_{ij}-x_{i-W,j-W+1}, \ldots, w_{ij}x_{ij}, \ldots, x_{ij}-x_{i+W,j+W-1}, x_{ij}-x_{i+W,j+W}]$. This representation is partially invariant to variations in intensity of an image. The amount of invariance can be modified by adjusting a weight, $w_{ij}$, associated with the central intensity component.

The self-organizing map (SOM), described by Teuvo Kohonen in an article entitled The Self-Organizing Map, which appeared in Proceedings of the IEEE, Vol. 78, pp. 1464–1480, in 1990, is an unsupervised learning process which learns the distribution of a set of patterns without any class information. In operation, a pattern is projected from an input space to a position within the self-organizing map and information is coded as the location of an activated node. The SOM is unlike other classification or clustering techniques in that it provides a topological ordering of the classes. Similarity in input patterns is preserved in the output of the process. The topological preservation of the SOM process makes it especially useful in the classification of data which includes a large number of classes. In the local image sample classification, for example, there may be a very large number of classes in which the transition from one class to the next is practically continuous therefore making it difficult to define hard class boundaries.

Figure 4:
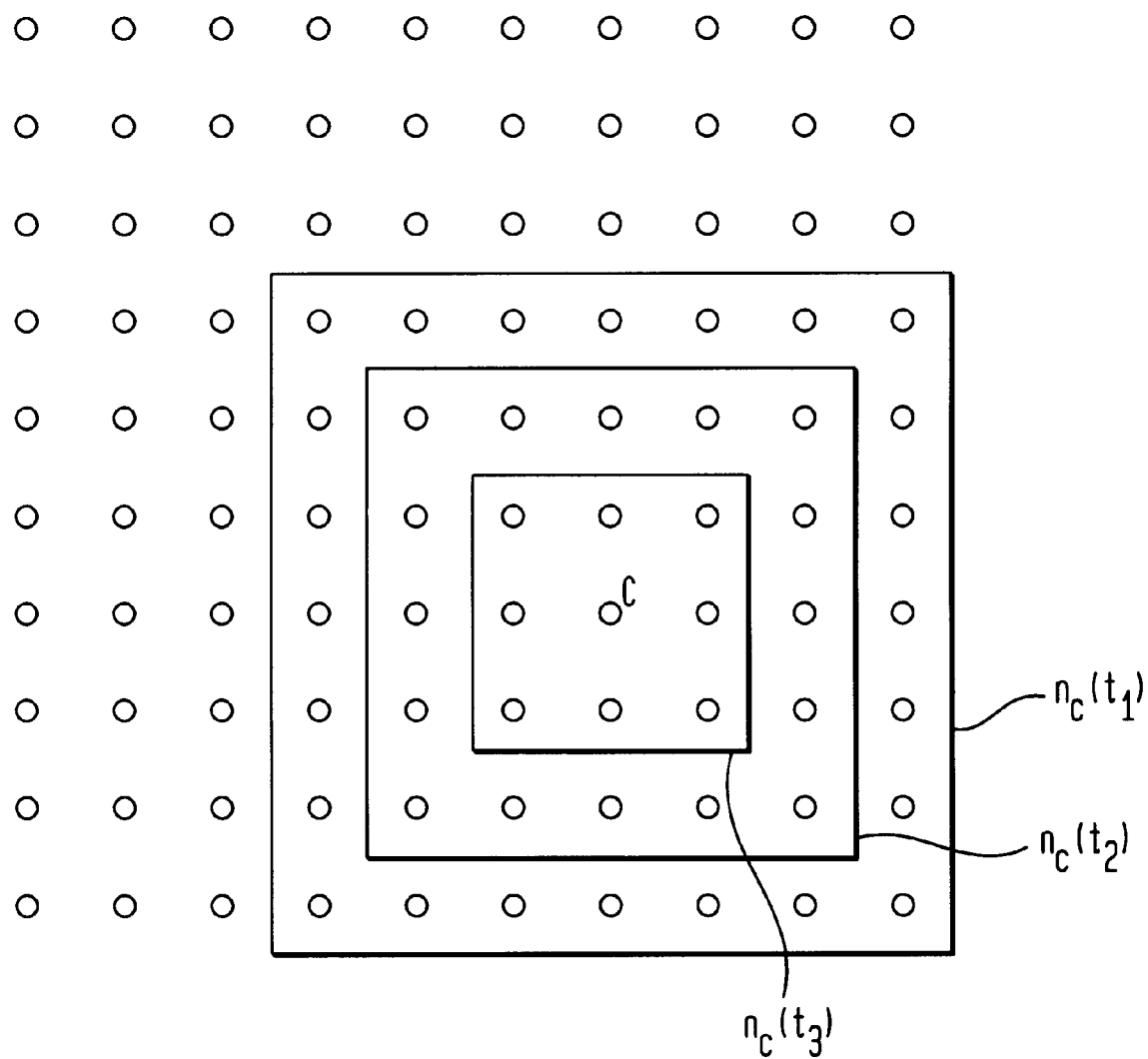
FIG. 4 shows a two-dimensional self-organizing map having a square neighborhood function which starts as $n_c(t_1)$ and reduces in size to $n_c(t_3)$ over time.

The SOM defines a mapping from an input space $R^n$ onto a topologically ordered set of nodes, usually in a lower dimensional space. An example of a two-dimensional SOM is shown in FIG. 4. A reference vector in the input space, $m_i = [\mu_{i1}, \mu_{i2}, \ldots, \mu_{in}]^T \in R^n$, is assigned to each node in the SOM. During training, each input, x, is compared to all the $m_i$, obtaining the location of the closest match according to a particular metric. The input point is mapped to this location in the SOM.

Nodes in the SOM are updated according to the metric and their position in relation to the winning node. For example, nodes may be updated according to:

$$m_i(t+1) = m_i(t) + h_{ci}(t)[x(t) - m_i(t)] \quad (1)$$

where t is the time during learning and $h_{ci}(t)$ is the neighborhood function, a smoothing kernel which is maximum at $m_c$. Usually, $h_{ci}(t) = h(\|r_c - r_i\|, t)$, where $r_c$ and $r_i$ represent the location of the nodes in the SOM output space. The node with the closest weight vector to the input sample is $r_c$ and $r_i$ ranges over all nodes. The variable $h_{ci}(t)$ approaches 0 as $\|r_c-r_i\|$ increases and also as t approaches ∞. While those skilled in the art can recognize that a number of neighborhood functions may be used, one useful neighborhood function is:

$$h_{ci} = \alpha(t)\exp\left(-\frac{\|r_c - r_i\|^2}{2\sigma^2(t)}\right) \quad (2)$$

where $\alpha(t)$ is a scalar valued learning rate and $\sigma(t)$ defines the width of the kernel. The SOM can be considered a non-linear projection of the probability density $p(x)$.

Self-organizing maps are normally used for the visualization of data. However, in the present invention, numbers are assigned to the nodes along each dimension of the SOM allowing the winning SOM output to be encoded into a vector whose length is equal to the number of dimensions in the SOM. Thus, the original vectors are mapped into a lower dimensional space such that points which are nearby in the original space are also nearby in the output space.

An efficient method known in the art which is utilized for reducing redundancy in a dataset is the Karhunen-Loève (KL) transform or eigenvector expansion via Principle Components Analysis (PCA). PCA generates a set of orthogonal axes of projections known as the principal components, or the eigenvectors, of the input data distribution in the order of decreasing variance. The KL transform is a statistical method for feature extraction and multivariate data projection and has been used widely in pattern recognition, signal processing, image processing, and data analysis. Points in an n-dimensional input space are projected into an m-dimensional space, $m \leq n$. The KL transform may be used as an alternative for the SOM in the dimensionality reduction of the local image samples. It should be noted that the use of the KL transform is not the same as in the eigenfaces approach because here, small local image samples are operated upon as opposed to the entire images. The KL technique is fundamentally different to the SOM method, as it assumes the images are sufficiently described by second order statistics, while the SOM is an attempt to approximate the probability density.

In principle, it should be possible to train a sufficiently large, multi-layer perceptron neural network to perform any required mapping—including that required to perfectly distinguish the classes in face recognition. In practice, however, such a system is unable to form the required features in order to generalize to unseen inputs (the class of functions which can perfectly classify the training data is too large and it is not easy to constrain the solution to the subset of this class which exhibits good generalization). A network which is large enough to classify the training data exhibits overfitting, functioning similarly to a lookup table and generalizing poorly. Additionally, there is no invariance to translation or local deformation of the images with such networks.

Convolutional networks (CN) are able to achieve a degree of shift and deformation invariance due to three characteristics, namely local receptive fields, shared weights, and spatial subsampling. The use of shared weights also reduces the number of parameters in the system, thereby aiding generalization.

Furthermore, convolutional networks have been successfully applied to character recognition as demonstrated by Y. LeCun, B. Boser, J. Denker, D. Henderson, R. Howard, W. Hubbard and L. Jackel, in an article entitled "Handwritten Digit Recognition with a Backpropagation Neural Network", which appeared in *Advances in Neural Information Processing Systems* 2, pp. 396–404, D. Touretzky, ed., Morgan Kaufmann, San Mateo, Calif., 1990.

Figure 5:
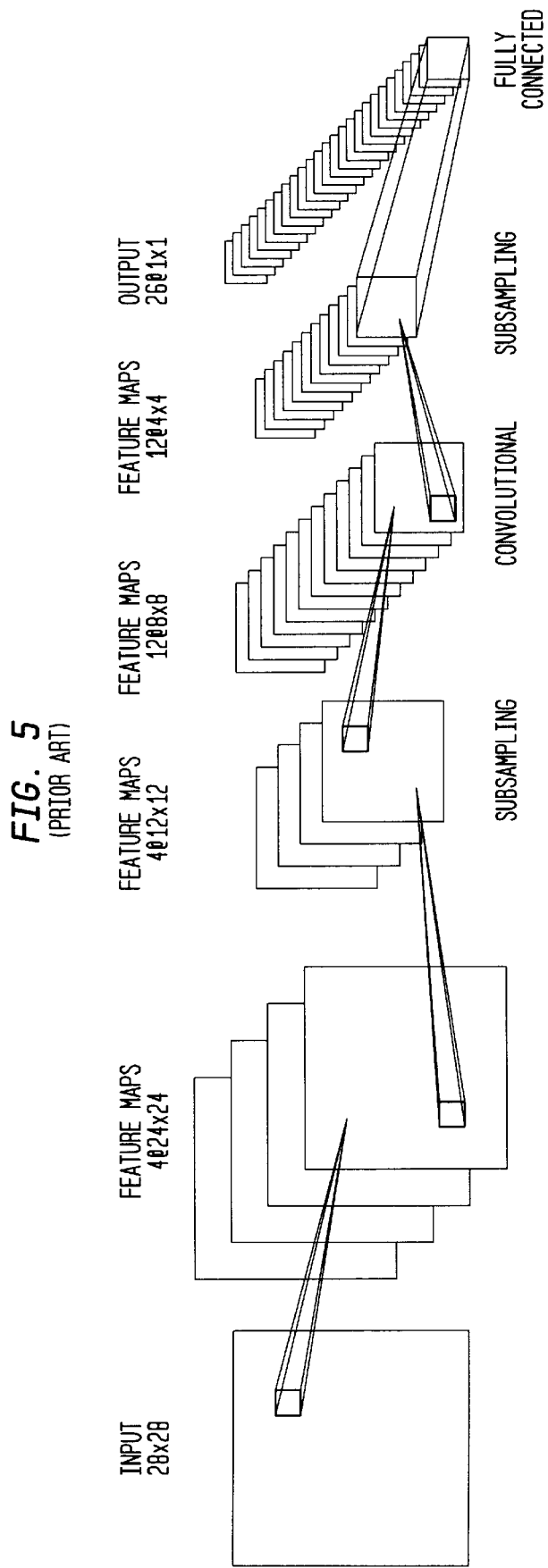
FIG. 5 is a prior art convolutional neural network for recognizing characters.

With reference to FIG. 5, there is shown a prior-art convolutional neural network suitable for recognizing handwritten characters. The convolutional neural network consists of a set of layers, each of which contains one or more planes. Approximately centered and normalized images enter at an input layer. Each unit in a particular plane receives input from a small neighborhood located in the planes of a previous layer. The weights forming the receptive field for a plane are forced to be equal at all points in the plane. Each plane can be considered as a feature map which has a fixed feature detector that is convolved with a local window which is scanned over the planes in the previous layer. Multiple planes are usually used in each layer so that multiple features can be detected. These layers are called convolutional layers. Once a feature has been detected, its exact location is less important. Hence, the convolutional layers are typically followed by another layer which does a local averaging and subsampling operation (e.g. for a sub-sampling factor of 2: $y_{ij}=(x_{2i,2j}+x_{2i+1,2j}+x_{2i,2j+1}+x_{2i+1,2j+1})/4$ where $y_{ij}$ is the output of a subsampling plane at position i, j and $x_{ij}$ is the output of the same plane in the previous layer). The network is then trained with a backpropagation gradient-descent procedure, the specifics of which are well known in the art.

The convolutional network used contains a number of layers excluding the input layer. A confidence measure can be calculated for each classification. One possible measure of confidence is $y_m(y_m-y_{2m})$, where $y_m$ is the maximum output, and $y_{2m}$ is the second maximum output. For this example, the outputs are transformed using the softmax transformation, namely:

$$y_i = \frac{\exp(u_i)}{\sum_{j=1}^{k} \exp(u_j)}$$

where $u_i$ are the original outputs, $y_i$ are the transformed outputs, and k is the number of outputs.

While the invention has been shown and described in detail in the context of a preferred embodiment, it will be apparent to those skilled in the art that variations and modifications are possible without departing from the broad principles and spirit of the invention which should be limited solely by the scope of the claims appended hereto.

What is claimed is:

1. A method for recognizing an object having an object having a set of features, the method comprising the steps of:
    sampling a plurality of local regions of an image of the object by stepping a local window in discrete steps over the image to generate a set of sample vectors;
    reducing the dimensionality of the sample vectors, including (a) training a self-organizing map on the set of sample vectors, (b) stepping, in discrete steps, the local window over any images contained in any training and any test sets, thereby producing a resultant local image sample at each one of the discrete steps, and (c) generating a new training set in an output space of the self-organizing map by passing the resulting local image samples through the self-organizing map;
    extracting the features of the object from the dimensionally reduced sample vectors, including training a convolutional neural network on the newly generated training set; and
    classifying the object into a known classification using the extracted features.

2. The method according to claim 1, wherein the reducing step further comprises a Karhunen-Loève transform.

3. An apparatus for recognizing an object, the apparatus comprising:

means for local image sampling which samples a plurality of local regions of an image of the object by stepping a local window in discrete steps over the image to generate a set of sample vectors;

means for dimensionality reduction which trains a self-organizing map on the set of sample vectors, and steps, in discrete steps, the local window over any images contained in any training and any test sets, thereby producing a resultant local image sample at each one of the discrete steps, and generates a new training set in an output space of the self-organizing map by passing the resulting local image samples through the self-organizing map;

means for feature extraction which extracts features of the object from the sample vectors and trains a convolutional neural network on the newly generated training set;

means for classification which classifies the object into a known classification using the extracted features.

4. The object recognition apparatus according to claim 3, wherein the feature extraction means successively transforms the output of the local image sampling means into a plurality of new representations which successively correspond to a set of higher level features of the image.

5. The object recognition apparatus according to claim 3, wherein the dimensionality reduction means further comprises means for performing a Karhunen-Loève transform.

6. The object recognition apparatus according to claim 3, wherein the classification means further estimates a probability that the image contains an individual member of a group based on the extracted features, and wherein the apparatus further comprises means for confidence estimation which estimates a confidence that the individual member of the group is contained within the image.

7. The object recognition apparatus according to claim 6, wherein the confidence estimation means generates the confidence according to $y_m(y_m-y_{2m})$ where $y_m$ is a first maximum output and $y_{2m}$ is a second maximum output of the classification means.

8. The object recognition apparatus according to claim 3, wherein the classification means is a multi layer perceptron style classifier.

9. The object recognition apparatus according to claim 3, wherein the classification means is a nearest neighbor system.

10. An apparatus for recognizing an object, the apparatus comprising:

means for local image sampling which samples a plurality of local regions of an image of the object by stepping a local window in discrete steps over the image to generate a set of sample vectors;

means for dimensionality reduction wherein the set of sample vectors is mapped into a space of lower dimension wherein similar points in the input space are mapped to similar points in the output space;

means for feature extraction which extracts features from the sample vectors;

means for classification which estimates a probability that the image contains an individual member of a group based on the extracted features;

means for confidence estimation which estimates a confidence that the individual member of the group is contained within the image;

wherein the feature extraction means successively transforms the output of the local image sampling means into a plurality of new representations which successively correspond to a set of higher level features of the image; and wherein the confidence estimation means generates the confidence according to $y_m(y_m-y_{2m})$, where $y_m$ is a first maximum output and $y_{2m}$ is a second maximum output of the classification means.

* * * * *